United States Patent
Miller

(10) Patent No.: US 8,188,305 B2
(45) Date of Patent: May 29, 2012

(54) METHOD OF PRODUCING BIODIESEL WITH SUPERCRITICAL ALCOHOL AND APPARATUS FOR SAME

(76) Inventor: David Miller, Sidney, ME (US)

(*) Notice: Subject to any disclaimer, the term of this patent is extended or adjusted under 35 U.S.C. 154(b) by 0 days.

(21) Appl. No.: 13/144,125

(22) PCT Filed: Feb. 1, 2010

(86) PCT No.: PCT/US2010/022722
§ 371 (c)(1),
(2), (4) Date: Jul. 12, 2011

(87) PCT Pub. No.: WO2010/090965
PCT Pub. Date: Aug. 12, 2010

(65) Prior Publication Data
US 2011/0271585 A1    Nov. 10, 2011

Related U.S. Application Data

(60) Provisional application No. 61/149,471, filed on Feb. 3, 2009.

(51) Int. Cl.
    *C11C 3/00* (2006.01)
(52) U.S. Cl. ...................................... 554/168
(58) Field of Classification Search .................... 554/168
    See application file for complete search history.

(56) References Cited

U.S. PATENT DOCUMENTS

| 6,818,026 | B2* | 11/2004 | Tateno et al. | 44/385 |
| 7,211,681 | B2* | 5/2007 | Furuta | 554/174 |
| 2003/0065202 | A1 | 4/2003 | Goto | |
| 2008/0196299 | A1* | 8/2008 | Anitescu et al. | 44/308 |
| 2008/0209799 | A1* | 9/2008 | Woods et al. | 44/411 |
| 2008/0249325 | A1 | 10/2008 | Kaevand | |
| 2009/0005582 | A1 | 1/2009 | Anderson | |

FOREIGN PATENT DOCUMENTS

| KR | 1020070052830 A | 5/2007 |
| WO | 2008001934 A1 | 1/2008 |
| WO | WO 2008001934 A1 * | 1/2008 |

* cited by examiner

*Primary Examiner* — Deborah D Carr
(74) *Attorney, Agent, or Firm* — Patricia M. Mathers

(57) ABSTRACT

A method is disclosed for obtaining an alkyl ester fuel, i.e., a biodiesel, and alcohol from a feedstock mixture of free fatty acids and/or glycerides mixed with a simple alcohol, such as methanol. The method uses an electrostatic probe to provide an electrical field within the reactor. This causes the glycerin molecules to precipitate out of the feedstock mixture. A drain is provided in the reactor, to drain the glycerin from the reactor. When the precipitated glycerin reaches a level to make contact with the electrostatic probe, an electrical circuit is closed, which causes the drain to open. When the level drops, the drain closes. Glycerin absorbs water and draining glycerin from the reactor naturally dehydrates the fuel.

10 Claims, 2 Drawing Sheets

METHOD OF PRODUCING BIODIESEL WITH SUPERCRITICAL ALCOHOL AND APPARATUS FOR SAME

This application claims priority from the provisional application 61/149,471, filed on Feb. 3, 2009, with the United States Patent Office.

BACKGROUND INFORMATION

1. Field of the Invention

The invention relates to the production of alkyl esters, i.e., biodiesel. More particularly, the invention relates to a method of producing biodiesel with supercritical alcohol. More particularly yet, the method relates to a multi-step process that removes excess water from the feedstock.

2. Description of the Prior Art

Chemically, vegetable oil and animal fats are known as triglycerides. A triglyceride is a glycerin molecule (C3H5 (OH)3) with three fatty acid molecules attached to three hydroxyl groups and glycerin is an alcohol with three hydroxyl groups.

A fatty acid is a long chain hydrocarbon molecule, and is found in vegetable oils and animal fats. Stearic, palmitic, and oleic acids are examples of fatty acids. A fatty acid is also known as an ester. Sometimes one or more of the fatty acids are detached from the glycerin molecule. These are known as free fatty acids or FFAs. A glycerin molecule with a single fatty acid attached is known as a monoglyceride, while a glycerin molecule with two fatty acids is known as diglyceride.

Biodiesel, properly known as an alkyl ester, is the result of transesterification of glycerides in which the fatty acid molecules are removed from the hydroxyl group of the glycerin and attached to the hydroxyl group of a single headed alcohol. Methanol, ethanol, propanol, and butanol are examples of single headed alcohols. The resulting biodiesel is known by the alcohol from which it was formed. Alkyl esters made with methanol are known as methyl esters; with ethanol as ethyl esters; with propanol as propyl esters; and with butanol as butyl esters. Alkyl esters can also be formed by esterification of FFAs, or transesterification of glycerides. An FFA is esterified when it combines with an alcohol molecule. A water molecule is formed when an FFA is esterified. Esterification is desirable for certain feedstocks, especially those with a high percentage of FFAs.

The most common means of performing transesterification is with the use of a base catalyst. The most common catalysts are potassium or sodium based. Small-scale biodiesel production processes use sodium hydroxide or potassium hydroxide, commonly known as lye. Larger biodiesel producers use sodium or potassium methylate, which is essentially the metal dissolved in methanol. Base transesterification works best with feedstocks low in FFAs because each FFA molecule combines with a catalyst molecule and produces a molecule of soap, rather than an alkyl ester. The loss of yield to the production of soap is typically 5-10%. The transesterification process takes about 30-120 minutes. The soap then has to be removed from the product stream by means of some cleaning process and the catalyst in the byproduct neutralized.

The most common means of esterification is with a strong acid catalyst such as sulfuric acid. The reaction is much slower than base transesterification, taking 4-8 hours, and because of that, generally requires the use of large capacity tanks. Furthermore, the reaction is self-limiting, because the esterification process itself produces water and water retards the reaction. Multiple stages are required if the feedstock is sufficiently high in FFA content. For example, waste oil that contains 20% FFA must go through at least two acid stages in order to be processed by the normal base stage. The first stage may reduce FFA content to 5%, the second to 1%. The first acid stage in a case like this produces a mixture of methanol, water, and acid that can be drained off, because of a combined density greater than that of the oil. At a minimum, the water must be removed before the next acid stage can take place.

A troublesome fluid byproduct that needs to be removed is produced in this step of the process. Methanol dissolves in water, as does sulfuric acid. The acid esterification process mixes dry oil, methanol, and sulfuric (or another very strong) acid. It's circulated for some hours to keep it well mixed, then left to stand. Over some additional hour(s), if enough FFAs were esterified to produce enough water, the mix of water/methanol/acid will sink to the bottom where it can be drained off. The acid must then be neutralized or saved for later use in neutralizing the base catalyst and the methanol must be recovered from the water. It's always problematic; the water must be removed, because it will cause soap formation in the base catalyzed phase, and removing the water also removes the alcohol. Furthermore, acid esterification incurs greater expense at each step of the process: tanks much larger than the transesterification tanks are needed; acid must be added and later neutralized; and methanol has to be recovered from the water produced by the esterification.

An alternate means of esterifying FFAs and transesterifying glycerides is to put the FFAs or glycerides in the presence of an alcohol in a supercritical phase. A phase is supercritical when the pressure and temperature are above the critical point for the alcohol. For methanol, the critical pressure is 81 bar, or approximately 1190 psi, and the critical temperature is 239.6 degrees C., or approximately 463 degrees Fahrenheit. In a supercritical phase, liquid disperses evenly throughout its environment, as a gas does, thus eliminating the need to emulsify the alcohol in the feedstock.

Keiichi Tsuto, et al, in U.S. Pat. No. 6,288,251 teach a supercritical method of transesterifying glycerides, in which a virtually complete conversion of glycerides occurs in several minutes, without a catalyst, at molar ratios of 40 to 1 or more alcohol to glycerin (for glycerides), and at temperatures of 350 degrees C. (662 degrees Fahrenheit) and pressures of 40 MPa (6,000 psi).

Commercial acid esterification processes use strong acids, such as sulfuric acid, and an alcohol, usually methanol. The esterification process produces water, which stops the reaction. Multiple stages are required if the FFA percentage is high, and the water/acid/methanol has to be drained between stages. Additional acid and methanol must be added to complete the esterification process. This acid esterification process is much slower than the base esterification process, normally taking a minimum of 4 hours.

Production of biodiesel with supercritical alcohol is known. Using a supercritical process for the esterification of FFAs or transesterification of glycerides avoids many of the problems of acid esterification and base transesterification. No base catalyst is used, so there is no saponification of FFAs, and the byproducts are nearly pure glycerin and excess alcohol with traces of water. Shiro Saka discloses in U.S. Pat. No. 7,227,030 that the supercritical process tolerates higher levels of water in the feedstock than catalytic processes. Cleaning the fuel after processing is greatly simplified because there is no soap to remove. The process yield approaches 100%, because FFAs are esterified rather than saponified. Any feedstock can be used, even 100% FFAs, because the FFAs are esterified without a catalyst.

The conventional supercritical process must run at temperatures from 500 to 700 degrees Fahrenheit and pressures from 3000 to 6000 psi. These operation parameters require the use of expensive equipment. The ratio of alcohol to feedstock is extremely high. For example, approximately 1.5 gallons of methanol must be mixed with each gallon of FFAs or glycerides that are fed through the process. The processor must be large enough to hold 2.5 gallons of the mixture for each gallon of alkyl esters to be produced, and, thus, must be approximately twice the size of a reactor used with the normal ratios of alcohol to feedstock in the catalytic process. Furthermore, the alcohol must be separated out at the end of the process. It is, of course, much more expensive to remove 1.4 gallons of alcohol, rather than 0.1 gallon. The ratio of alcohol to feedstock is necessarily a molar ratio of oil molecules to alcohol molecules. Ethanol/propanol/butanol molecules are larger than methanol molecules, and thus, an even greater volume of higher alcohols is required when using these alcohols.

What is needed, therefore, is a method of producing biodiesel that requires less time than conventional methods and is less expensive to implement. What is further needed is a process that prevents FFAs from binding with glycerin during processing. What is yet further needed is a process that reduces the ratio of alcohol to feedstock required to obtain full conversion of glycerides to alkyl esters.

BRIEF SUMMARY OF THE INVENTION

The invention is a method of and apparatus for creating alkyl esters by isolating glycerin molecules from a feedstock-alcohol mixture. The feedstock may be a glyceride, such as a triglyceride, or an FFA. Examples of feedstock include cooking oils and fats, i.e., vegetable oils, animal fats, and combinations of oils and fats. The oils and fats may be also be waste products, i.e., cooking oils and fats that have outlived their usefulness for human consumption. Free Fatty Acids (FFAs) are fatty acids, such as palmitic or stearic acid, that are no longer chemically attached to a glycerin molecule. Another name for an alkyl ester is "biodiesel" and these two terms are used herein interchangeably. The apparatus according to the invention comprises a reactor with an anode, which, together with a grounded housing, generates an electric field within the reactor itself. An electrostatic probe is provided within the reactor to establish an electric circuit that controls a drain valve for glycerin. Glycerin is a polar molecule with a much higher density than alcohol, water, or the feedstock itself. When glycerin molecules align within the electric field, the molecules are electrically attracted to each other and coalesce very quickly into small droplets that readily drop out of suspension because of their density. The reactor is placed at an angle and the feedstock inlet placed at the lower end of the reactor. The glycerin settles at the bottom of the reactor, above an electrically controlled drain. When the level of the glycerin is high enough to cover the end of the probe, a conducting circuit is created, which opens a drain valve. As the level of the glycerin drops below the probe, the circuit is interrupted and the drain valve is closed.

An electric field strength of 100-300 volts per inch in the reactor has experimentally been demonstrated to be adequate to process the feedstock, though higher or lower strengths may also function well.

An example of suitable parameters for processing the feedstock is as follows: a residence time of 6 to 8 minutes has been experimentally determined to achieve adequate transesterification of glycerides with a molar ratio of alcohol to triglycerides of 10 to 1, a pressure of 1500 psi, and a temperature of 330 degrees C. This is merely an example of a system that functions well. It is understood that other parameters for temperature, pressure, residence time, and ratios will also work, as will other alcohol types. Higher temperatures and pressures speed the reaction but require more expensive equipment. The ratio of alcohol to glycerides must be adjusted, based on the FFA content of the feedstock. For feedstocks with less than 10% FFAs, molar ratios of 8 to 1 glycerides to alcohol will suffice. For feedstock with an FFA content of up to 30%, molar ratios of 15 to 1 will suffice.

The method according to the invention naturally dehydrates the fuel throughout the process because of the electrostatic precipitation. Water is also a polar molecule, and, when esterifying nearly pure FFAs, the electrostatic field will coalesce and precipitate the water, just as happens with the glycerin. Any glycerin in the feedstock will absorb a large portion of the water and carry it off. The method of producing alkyl esters according to the invention has a naturally high tolerance for water, whether it is in the feedstock or produced by esterification. Optionally, glycerin may be reintroduced into the reactor to absorb excess water and be electrostatically precipitated. This step is only necessary when excess water is present in the process.

The combination of temperatures and pressures mentioned above produces a fuel with an FFA content between 1% and 5%. Specifications for biodiesel require no more than approximately 0.25% FFA. One of several options may be employed to complete the esterification process. First, the fuel so obtained may be dehydrated so esterification may be completed with less alcohol. Dehydration may be accomplished by several methods, such as distilling off the water and alcohol, removing the water with an adsorbent or molecular sieve, or adding glycerin back into the fuel, mixing thoroughly so the glycerin absorbs most of the water, and removing the water, glycerin, and some of the alcohol through electrostatic precipitation. Temperature and pressure in the reactor may also be controlled so as to maintain the alcohol in a supercritical state while changing water from a liquid to vapor. Liquid water during the transesterification stage accelerates breakdown of glycerides, but can be vaporized and removed in the final esterification stage, which allows more complete esterification of FFAs. The steam rises to the top of the esterification reactor, where it may be detected and removed. Lastly, the water may be electrostatically coalesced and precipitated as described above and drained as a liquid.

Non-catalytic esterification is more effective at lower temperatures and pressures than are ideal for transesterification. In particular, temperatures that are just short of supercritical and pressures between 1600 and 1800 psi have been experimentally shown to be optimal. The molecular energy available at higher temperatures and pressures breaks apart alkyl-esters more quickly, just as it breaks glycerides into fatty acids and glycerin. A heat exchanger may be used to extract heat from the fuel coming out of the processor and use it to heat the feedstock being pumped into the processor. In a typical installation, the volume of the heat exchanger is approximately equal to the volume of the processor, so the residence time of the fuel in the heat exchanger and in the processor is approximately the same. The feedstock entering the heat exchanger is gradually warmed and partially esterified as it enters the final heater and processor. The temperature of high FFA fuel leaving the processor at supercritical temperatures is gradually cooled off as it flows through the heat exchanger and transfers its heat to the incoming feedstock. The time spent cooling in the heat exchanger constitutes a natural esterification environment, so the fuel has a lower acid content than it otherwise would.

The FFA content of the fuel can be brought within fuel-use specifications by taking the fuel from the output of the heat exchanger and passing it over a solid acid catalyst such as Dowex DR2030. The time the fuel must be in contact with the resin varies with the FFA content, alcohol type and amount, temperature, and pressure. The FFA levels can optionally be controlled with a solid catalyst placed within either the processor or heat exchanger. This is a known process.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art. The same reference designations in different embodiments indicate that the elements are functionally the same. In all of the embodiments shown, the wavy lines in the reactors indicate a feedstock mixture, the small circles at the lower end the reactors indicates glycerin or a glycerin and water.

Figure 1:
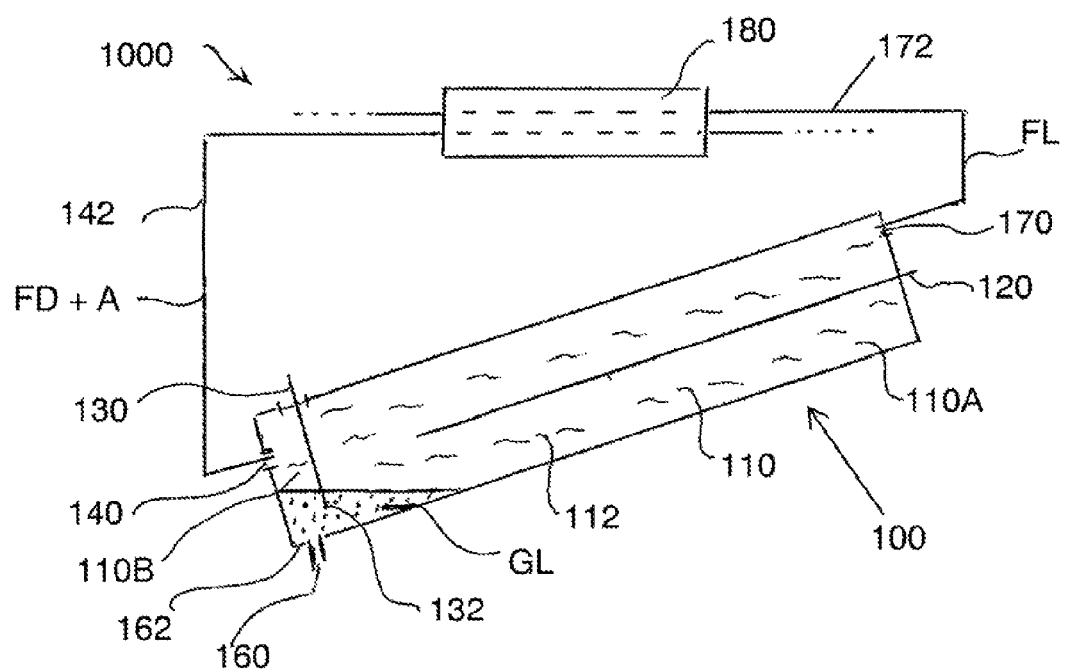
FIG. 1 is a schematic illustration of the reactor with electrostatic separator for supercritical production of alkyl esters with continuous electrostatic removal of glycerin.

FIG. 1 illustrates a first method 1000 and reactor 100 for supercritical production of alkyl esters according to the invention. The reactor 100 comprises a housing 110 that encloses a reaction chamber 112, the housing having an inlet port 140 near a lower end 110B of the housing, a discharge port 170 at an upper end 110A, and a drain 160 at the lower end 110B. An anode 120 extends into the chamber 112. The housing 110 is grounded. An electrostatic probe 130 that serves to control the opening and closing of the drain 160 is provided near the lower end 110B, extending in the direction of the drain 160. Feedstock FD comprising FFAs and/or glycerides is mixed with a simple alcohol A, such as methanol. The mixture is heated to a temperature above the critical point for the alcohol A and pumped into the reactor 100 through the inlet port 140 at a pressure above the critical pressure of the alcohol. Free fatty acids and/or glycerides are esterified and transesterified, respectively, in the chamber 112 over the course of several minutes into glycerin GL and alkyl esters. An electric field is maintained in the chamber 112 between the anode 120 and the grounded housing 110. The electric field polarizes the glycerin molecules GL, causing the glycerin to coalesce into droplets, which then drop out of the mixture because of the higher density of glycerin.

Glycerin GL is much more electrically conductive than the feedstock FD. When glycerin GL accumulates at the lower end 110B of the housing 110 in a sufficient amount to cover a lower end 132 of the electrostatic probe 130, a conducting circuit is established between the electrostatic probe 130 and ground. The drain 160 has a valve 162 that is controlled by this circuit. The valve 162 opens when the circuit is conducting, thereby allowing the glycerin GL to drain from the reactor 100. When the level of the glycerin GL is below the lower end 132 of the electrostatic probe 130, the circuit is interrupted and the valve 162 closed. Ideally, the length of the electrostatic probe 130 is dimensioned such that a small amount of glycerin GL remains in the reactor 100, to prevent feedstock FD from draining from the reactor 100. Fuel FL, along with traces of glycerin GL, water, and excess alcohol are pumped out of the reactor 100 at the discharge port 170. A heat exchanger 180 may be incorporated into the production process to extract heat from the exiting fuel FL and to apply the heat to incoming feedstock FD. A fuel line 172 leads from the discharge port 170 through the heat exchanger 180 and a feed line 142 leads through the heat exchanger 180 into the inlet port 140. FFAs that were not esterified under the supercritical conditions of processor 112 are more completely esterified in the heat exchanger 180 as the process temperature gradually declines. Water introduced within the feedstock FD or produced during initial esterification is absorbed by the glycerin GL and/or coalesced by the electrostatic field and is drained off with the glycerin GL via drain 160.

Figure 2A:
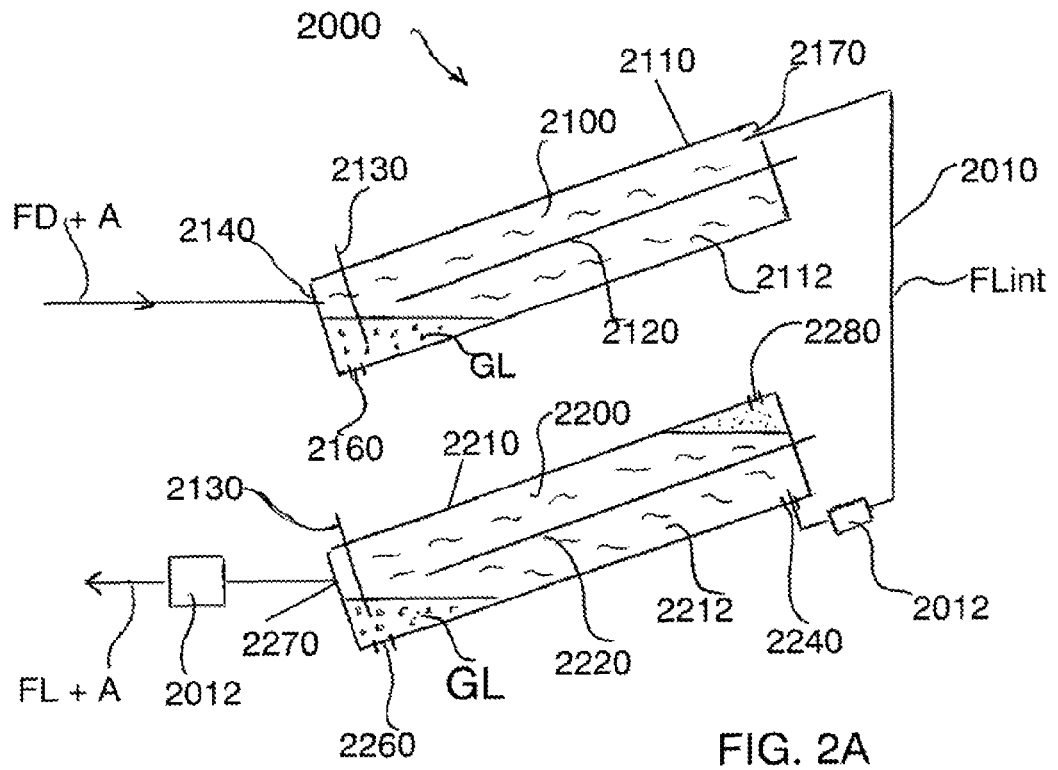
FIG. 2A is a schematic illustration of the removal of glycerin and water in a multi-stage process.

FIG. 2A illustrates a second method and apparatus 2000 according to the invention of producing alkyl esters, wherein excess water is removed from the process in the form of steam. The apparatus in FIG. 2A uses a pair of pressure regulators 2012 to maintain different pressures in successive reaction chambers. In the embodiment shown, the method is a multi-stage process that includes a transesterification reactor 2100 and an esterification reactor 2200. Note that while reactor 2100 is labeled as "transesterification reactor" some initial esterification occurs within it, particularly with high FFA content feedstock. The transesterification reactor 2100 has a housing 2110 that encloses a chamber 2112, the housing having an inlet port 2140, a discharge port 2170 and a drain 2160. The esterification reactor 2200 also has a housing 2210 that encloses a chamber 2212, an inlet port 2240, a fuel discharge port 2270, and a steam discharge port 2280. A fuel conduit 2010 transports intermediate fuel $FL_{INT}$ from the transesterification reactor 2100 to the esterification reactor 2200. The pressures and temperatures of the reactors 2100 and 2200 are controlled at 2012, so as to vaporize the water into steam in the esterification reactor 2200. The steam is then discharged through the steam discharge port 2280.

By way of example, a mixture of feedstock FD and alcohol A are pumped into the transesterification reactor 2100 at a temperature of 345 degrees C. and a pressure of 2400 psi. A voltage of +300 V per inch is applied to the mixture by anode 2120. Glycerin GL precipitates out of the mixture and collects at the lower end of the reactor 2100, where it drains off through the drain 2160. This step takes generally 6 to 10 minutes. The intermediate fuel $FL_{INT}$ is discharged through the discharge port 2170 and carried via the fuel conduit 2010 and pumped through the inlet port 2240 into the esterification reactor 2200. Here again a voltage of +300 V per inch is applied to the mixture. Water is converted to steam and discharged through the steam-discharge port 2280. Means for converting water to steam are well known and are not described in any detail herein. Common methods include heating the water to the boiling point or decreasing the pressure, so that the water flashes over to steam. Glycerin GL collects at the lower end of the reactor 2200 and drains off through drain 2260. The finished product, i.e., the alkyl ester fuel FL, is discharged through the fuel-discharge port 2270. The electrostatic precipitation and the drain control 2130 in the reactor 2100 and 2230 in the reactor 2200 are described above with reference to the electrostatic probe 130 shown in FIG. 1.

Figure 2B:
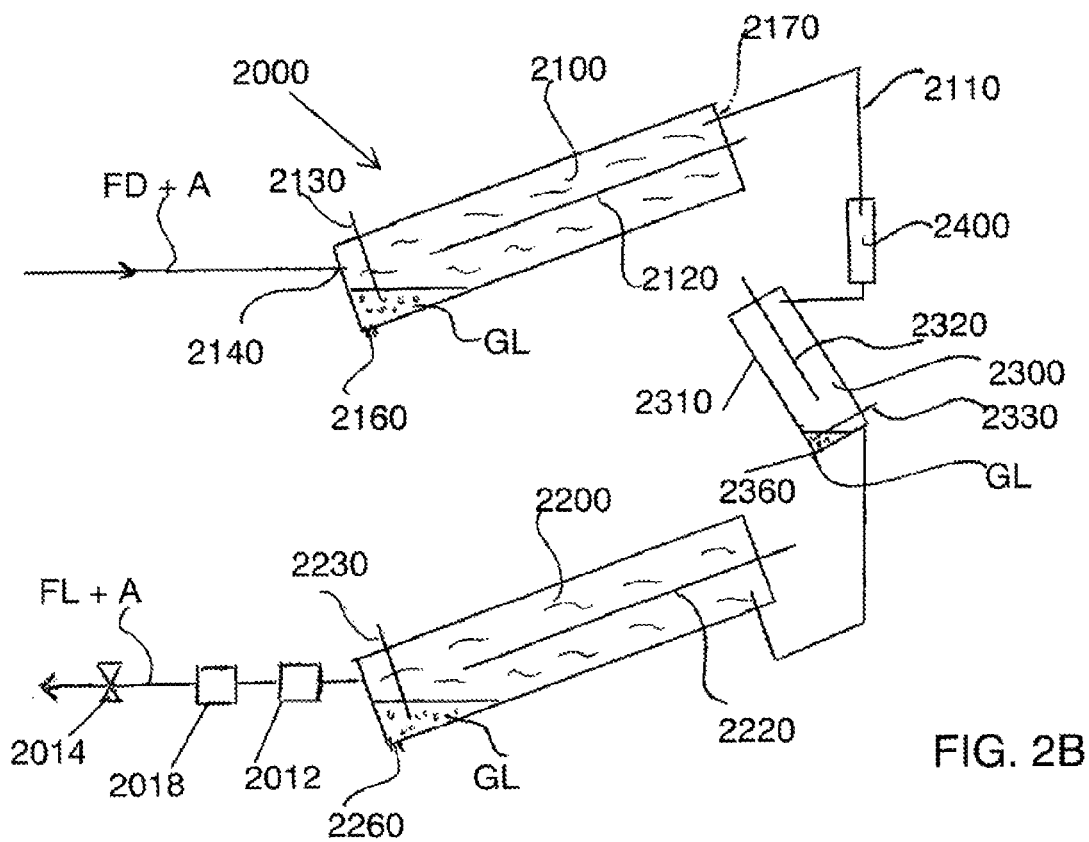
FIG. 2B is a schematic illustration of the removal of glycerin and water in a multi-stage process, with an additional process for water removal via addition of glycerin as a dehydrating agent.

FIG. 2B illustrates a method of removing water generated through esterification or introduced with the feedstock. Because water is fully miscible in glycerin and not miscible at all in oil or biodiesel, glycerin mixed with wet biodiesel will absorb most of the water. In the presence of an electrostatic field, the glycerin and water mixture will coalesce and precipitate from the feedstock. As shown in FIG. 2B, a mixture of feedstock FD, which includes oil and FFAs, and alcohol A is introduced into the transesterification reactor 2100 through an inlet port 140. The feedstock-alcohol mixture is preheated under pressure to 345 degrees C. prior to injection into the transesterification reactor 2100.

The FFAs are esterified and the glycerides undergo transesterification for approximately 2 to 4 minutes. The electric field between the anode 120 and the housing wall of the reactor 2100 causes the free glycerin to rapidly coalesce and precipitate from the feedstock FD. The glycerin GL is drained from the reactor 2100 through the drain 2160. The remaining mixture contains partly transesterified glycerides, water produced through esterification, water from the feedstock, and mostly esterified FFAs. This mixture is pumped through the outlet port 2170 into a static mixer 2400, where it is again mixed with glycerin GL. The glycerin GL recovered from the drains 2160 and 2260 may also be re-introduced into the static mixer 2400. The glycerin GL mixes with the feedstock mixture, during which process it absorbs water from the feedstock FD. The glycerin-feedstock-water-alcohol mixture then flows into a glycerin removal chamber 2300, in which an electrostatic field between the anode 2320 and the chamber wall 2310 causes the coalesced glycerin-water droplets to precipitate out, thereby removing water from the feedstock FD. The glycerin-water droplets are removed through the drain from the chamber 2300 via the drain control 2330 and the corresponding drain 2360. The remaining feedstock-alcohol mixture, i.e., the biodiesel, glycerides, and alcohol, flows into a second reaction chamber, a transesterification reactor 2200, where the mixture undergoes final esterification. In this reactor 2200, the glycerin GL and water are electrostatically precipitated out and removed via the drain control 2230 and drain 2260. A pressure regulator valve 2012 maintains the necessary pressure in the reactor chamber 2200, to ensure that the alcohol A remains in a supercritical state. Alkyl esters, in this case, methyl esters, and excess alcohol, i.e., alcohol A, exit the reactor chamber 2200 via an exit valve 2014. The fuel FL and alcohol A are cooled and cleaned for use.

The process of converting water to steam and removing it from the reactor via a steam discharge port, as described with reference to FIGS. 2A and 2B, may also be implemented with the apparatus shown in FIG. 1. The reactor 100 would then be equipped with a steam discharge port and the necessary pressure regulator or heater to convert the water.

The fuel product FL obtained from the methods 1000 and 2000 according to the invention may be processed through a solid catalyst to bring the fuel into compliance with ASTM or other fuel quality standards. Under some combinations for temperature, pressure, and residence time, the fuel may be free of bound glycerin GL, but still contain some unesterified FFAs, enough to fail ASTM or other standard tests for fuel quality. Prior to separating out the excess alcohol A, these FFAs may be esterified in a final esterification process 2018 by passing the fuel with the excess alcohol over a wide variety of conventional solid acid catalysts. An example of a suitable catalyst is Dowex DR2030.

It is understood that the embodiments described herein, including the operating parameters of temperature, pressure, and time, are merely illustrative of the present invention. Variations in the construction of the method and apparatus for producing biodiesel may be contemplated by one skilled in the art without limiting the intended scope of the invention herein disclosed and as defined by the following claims.

What is claimed is:

1. Method of producing an alkyl ester in a supercritical process, the method comprising the steps of:
   a) feeding a feedstock-alcohol mixture into a reactor for processing the feedstock-alcohol mixture into alkyl ester, the reactor being equipped with a means for electrostatically precipitating glycerin from the feedstock-alcohol mixture and a drain for draining the precipitated glycerin from the reactor;
   b) bringing alcohol in the feedstock-alcohol mixture to a supercritical state, so as to convert the feedstock-alcohol mixture into glycerin molecules and alkyl esters;
   c) precipitating the glycerin from the feedstock-alcohol mixture;
   d) draining the glycerin from the reactor; and
   e) discharging from the reactor a fuel comprising the alkyl esters.

2. The method of claim 1, further comprising the step of:
   f) adding glycerin to the feedstock-alcohol mixture to remove excess water.

3. The method of claim 1, further comprising the step of:
   g) passing the fuel through a final esterification process that includes a solid acid catalyst, so as to remove excess free fatty acids from the fuel.

4. The method of claim 1, further comprising the step of:
   h) providing a heat exchanger for removing heat from the discharged fuel and using the heat obtained from the fuel to raise the temperature of the feedstock-alcohol mixture prior to feeding the feedstock-alcohol mixture into the reactor.

5. The method of claim 1, wherein the reactor includes a system of two reactors, a transesterification reactor and an esterification reactor and the method includes the steps of:
   i) maintaining flow communication between the two reactors by means of a fluid conduit that transports an intermediate fuel from the transesterification reactor to the esterification reactor;
   j) providing a pressure regulator in each of the two reactors;
   k) providing a steam discharge port in the esterification reactor;
   l) vaporizing water in the intermediate fuel; and
   m) discharging the vaporized water from the esterification reactor through the steam discharge port.

6. The method of claim 5, further comprising the step of maintaining different pressures in the two reactors, wherein the water is vaporized by means of a maintaining a sufficiently high pressure in one of the two reactors so as to cause the water to flash over to vapor.

7. The method of claim 5, further comprising the steps of:
   n) providing a heater in one of the two reactors; and
   o) maintaining the same pressure in the two reactors;
      wherein the water is vaporized by raising the temperature of the water to the boiling point and discharging the vaporized water from the esterification reactor through the steam discharge port.

8. The method of claim 1, wherein the reactor includes a system of two reactors, a transesterification reactor and an esterification reactor, and the method includes the steps of:

p) maintaining flow communication between the two reactors by means of a fluid conduit that transports an intermediate fuel from the transesterification reactor to the esterification reactor;
q) providing a mixer and a glycerin removal chamber in the fluid conduit between the transesterification reactor and the esterification reactor;
r) adding glycerin into the mixer;
s) allowing the glycerin to absorb water from the mixture in the mixer; and
t) removing the glycerin with absorbed water from the mixer.

9. The method of claim 1, further comprising the step of:
u) separating excess alcohol from the fuel that is discharged from the reactor.

10. The method of claim 1, further comprising the step of:
v) converting water to steam and removing the steam from the reactor via a steam discharge port.

* * * * *